United States Patent [19]

Langlais et al.

[11] Patent Number: 5,184,956
[45] Date of Patent: Feb. 9, 1993

[54] METHOD AND DEVICE FOR TRAINING IN THE DRIVING OF VEHICLES

[75] Inventors: Bernard Langlais, Thiais; Christian Saunier, Ermont, both of France

[73] Assignee: Codes Rousseau, Les Sables D'Olonne, France

[21] Appl. No.: 657,046

[22] Filed: Feb. 19, 1991

[30] Foreign Application Priority Data

Feb. 20, 1990 [FR] France ............................ 90 02006

[51] Int. Cl.⁵ .............................................. G09B 9/05
[52] U.S. Cl. ........................................ 434/69; 434/62; 273/442; 364/578; 340/717; 359/857
[58] Field of Search ........................ 434/29, 30, 32, 33, 434/38, 43, 62, 63, 69; 273/86 B, 442, 454; 364/410, 578; 358/87, 104; 340/717; 359/857

[56] References Cited

U.S. PATENT DOCUMENTS

| | | | |
|---|---|---|---|
| 3,488,861 | 1/1970 | Jones et al. | 434/69 |
| 3,833,759 | 9/1974 | Yatabe et al. | 358/104 X |
| 4,063,815 | 12/1977 | Wilken et al. | 359/857 X |
| 4,760,388 | 7/1988 | Tatsumi et al. | 340/717 |
| 4,817,948 | 4/1989 | Simonelli | 434/63 X |
| 4,846,686 | 7/1989 | Adams | 434/69 |
| 5,015,189 | 5/1991 | Wenzinger, Jr. | 434/69 X |

Primary Examiner—Richard J. Apley
Assistant Examiner—Joe Cheng
Attorney, Agent, or Firm—Millen, White, Zelano and Branigan

[57] ABSTRACT

The invention relates to a method and a device for training in the driving of vehicles and especially land vehicles, in which a sequence of images is displayed on a screen placed opposite to a driving station for a trainee driver and is caused to move in accordance with control operations initiated from said driving station. There are thus displayed on the screen both a front main image and at least one rear vision secondary image which is made visible on an associated rear-view mirror provided at the driving station. The main image and the secondary image are synthetic images generated by a computer from a data base containing the description of a three-dimensional road circuit.

13 Claims, 4 Drawing Sheets

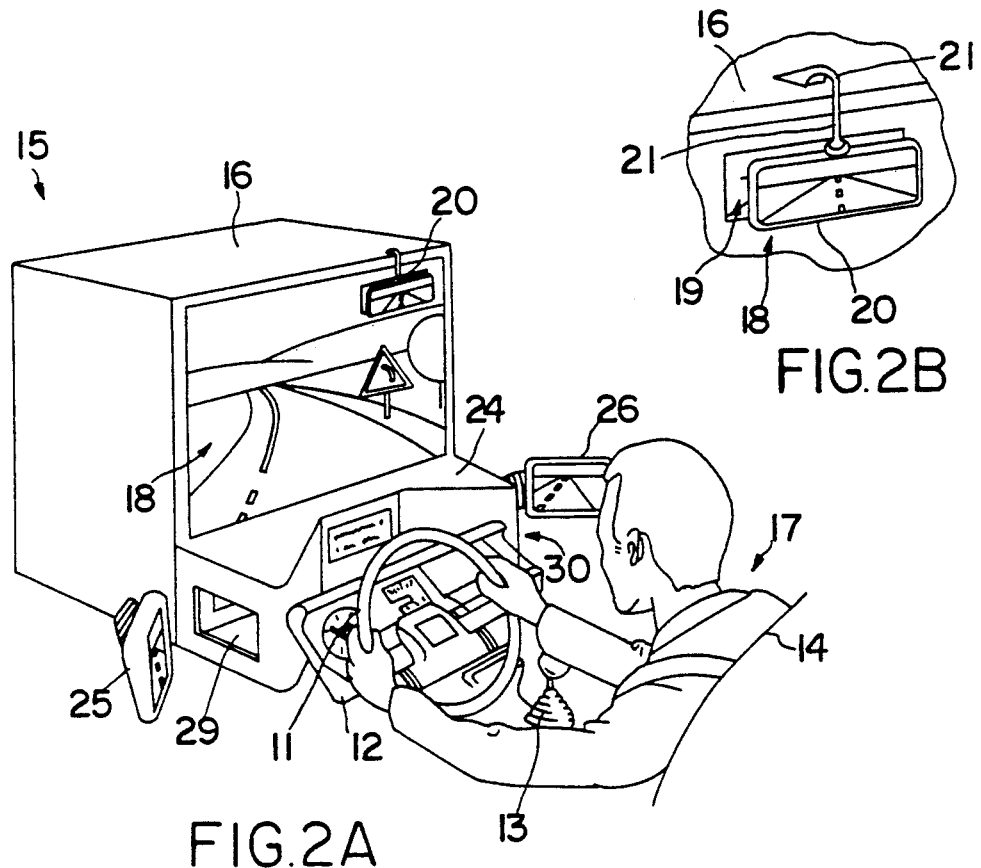
FIG.2B
FIG.2A
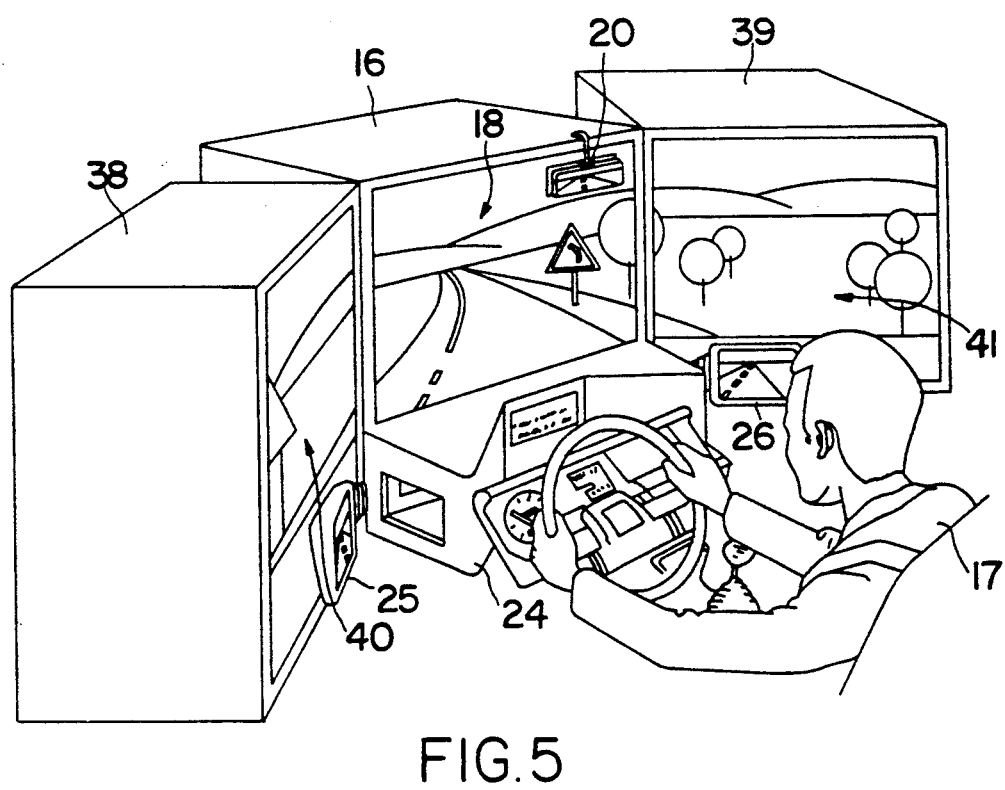
FIG.5

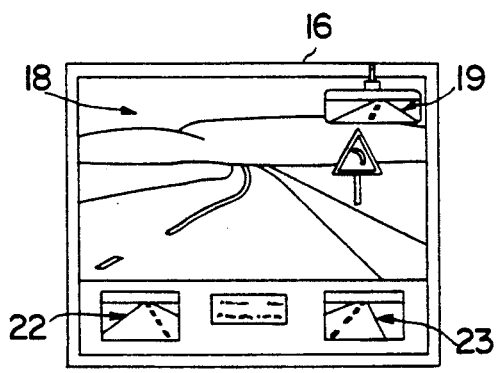
FIG.3A
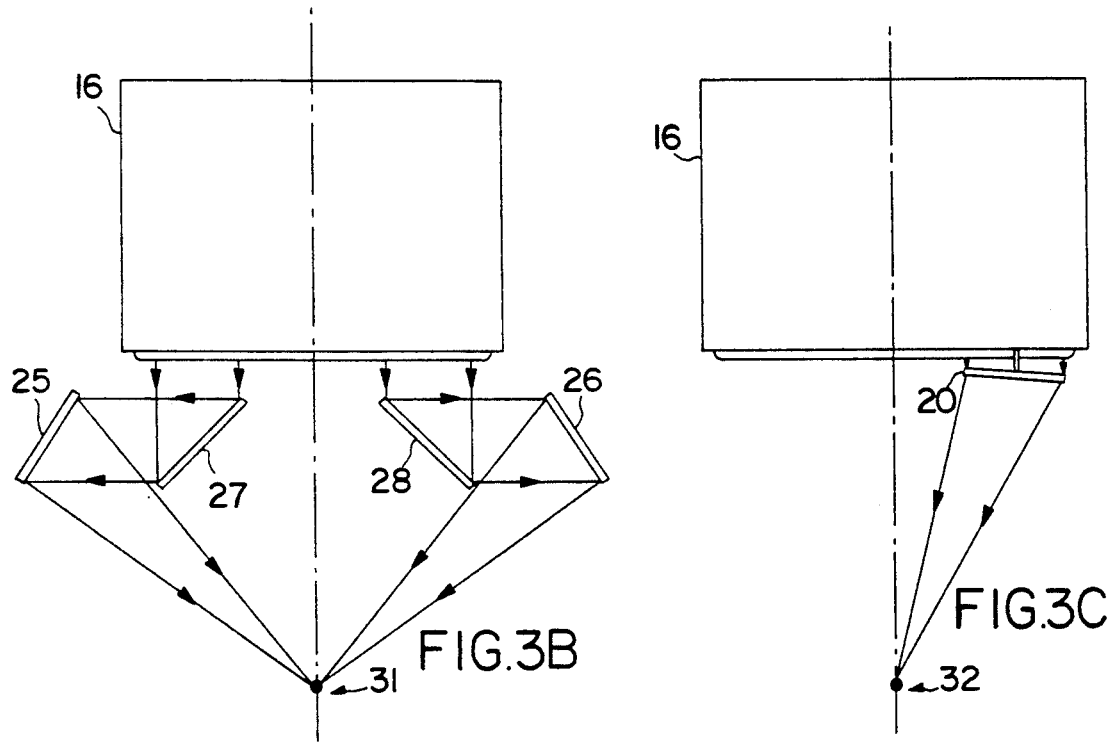
FIG.3B
FIG.3C
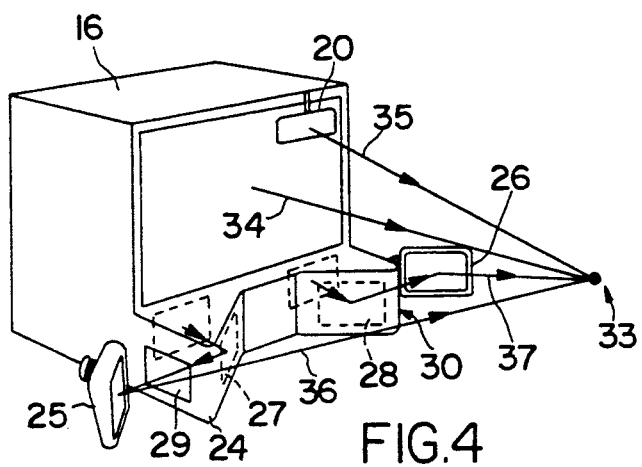
FIG.4

METHOD AND DEVICE FOR TRAINING IN THE DRIVING OF VEHICLES

BACKGROUND OF THE INVENTION

1. Field of the Invention

The present invention relates to the equipment and techniques for simulating the conditions of driving moving vehicles in order to teach trainees to drive such vehicles. The invention is more particularly concerned with applications which relate to driving of automotive vehicles, especially passenger cars and other land vehicles which may be equipped either with wheels or caterpillar tracks.

2. Background Art

Various techniques, which are more or less complex and costly, have already been proposed for simulating a landscape as it passes in front of a student driver who is training in a fixed driving station. An image display screen is employed for this purpose and placed opposite to the driving station. On the screen are displayed sequences of images extracted from previous recordings which can be either motion picture or video recordings of real landscapes as in French patent Application No. 83 20136 filed on Dec. 15, 1983 and published under No. 2 556 866 or synthetic images.

With respect to the known techniques, the invention proposes to obtain a simulation which is closer to the real conditions of car driving as considered in all cases in which the driver must not only control his vehicle according to an environment which he observes in front of him, but must also keep a watch on what is going on behind him by means of rear-view mirrors.

To this end, the invention relates to a method for training drivers of land vehicles, in which a sequence of images is displayed on a screen placed opposite to a driving station for a trainee driver and is caused to move in accordance with control operations initiated from said driving station displayed on the screen both a front main image and at least one rear vision secondary image which is made visible on an associated rear-view mirror provided at the driving station. The main image and secondary image are synthetic images generated by a computer from a data base containing the description of a three-dimensional road circuit.

The invention lends itself particularly well to reproduction of the driver's visual environment by means of the technique of generation of synthetic images. The main images and the secondary images can be generated simultaneously on one and the same screen by a computer from a data base containing the description of a three-dimensional road circuit. Generating all these images on the same screen is particularly advantageous and leads to a simplified or stylized representation of the rear vision images with respect to the front main image. Moreover, it is understood that these secondary images are generated and inserted in the main image from information extracted from the data base so as to correspond to fields of vision behind the driver as is the case with a true motor vehicle driving station whereas the main image is generated from information corresponding to a front field of vision.

The invention also has for its object a device for training in the driving of motor vehicles, comprising at least one display screen opposite to a driving station for a trainee driver, characterized in that said images are generated by a computer from a data base containing the description of a three-dimensional road circuit and that it comprises, in addition to first means for generating a front main image in accordance with control operations of said driving station, at least second means for generating at least a first rear vision secondary image. The rear vision secondary image is inserted in the front image on a first portion of said screen and first optical collects reflects the first secondary image to an associated rear-view mirror provided at the driving station.

In a preferred embodiment of a device of this type, the video monitor screen is integrated in a casing which conceals the lower portion of the screen at the level of secondary images corresponding to at least one lateral rear-view mirror and the casing contains a mirror for reflecting secondary images to the lateral rear-view mirror.

In an alternative embodiment of the invention, the device comprises in addition two video monitor screens designed to restitute lateral main images on each side of the front main image.

BRIEF DESCRIPTION OF THE DRAWINGS

There will now be described in greater detail a particular embodiment of the invention which will serve to gain a better understanding of its essential features and advantages, it being understood, however, that this embodiment is chosen by way of example and that it does not imply any limitation whatsoever. The description of the invention is illustrated in the accompanying drawings, in which:

FIG. 2A is a schematic diagram showing in perspective a simulation device in accordance with the invention which serves to give a representation of the driver's visual environment;

FIG. 2B is an enlarged view showing a detail of FIG. 2A;

FIG. 3A is a schematic front view of the screen of the device shown in FIG. 1;

FIGS. 3B and 3C are top views illustrating schematically the means for collecting and reflecting secondary images in accordance with the invention;

FIG. 4 is a view in perspective which shows a display console in accordance with the invention and illustrates more particularly the optical paths;

FIG. 5 is a view in perspective showing a second embodiment of a simulation device in accordance with the invention.

DETAILED DESCRIPTION

Figure 1:
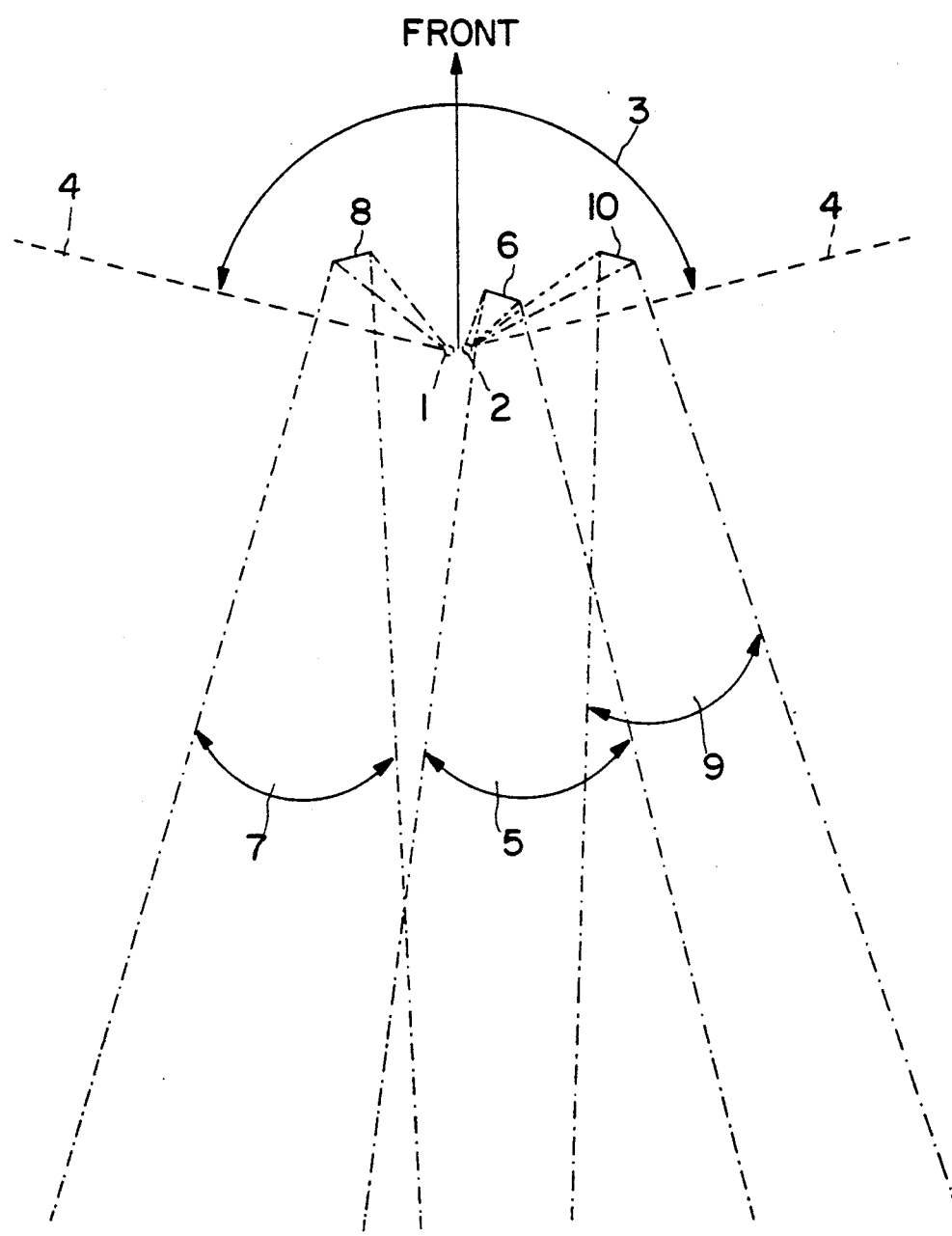
FIG. 1 is a schematic diagram showing the different fields of vision of a driver at the steering-wheel of an automotive vehicle.

FIG. 1 illustrates schematically the different fields of vision which are made available to the driver of a motor vehicle and which the invention endeavors to reproduce in its simulation device.

These fields of vision are defined with respect to the position of the driver's two eyes 1 and 2 and they include the following:

a direct front field of vision designated by the arrow 3 towards the front of the vehicle and limited by the dashed lines 4;

a central field of rear vision designated by the arrow 5 and reflected to the driver's eyes by means of an inner rear-view mirror 6;

a first lateral field of rear vision designated by the arrow 7 and reflected to the driver's eyes by means of a first lateral outer rear-view mirror 8;

and possibly a second lateral field of rear vision designated by the arrow 9 and reflected to the driver's eyes by means of a second lateral outer rear-view mirror 10.

In the representation of FIG. 1, the fields of rear vision correspond to those of a vehicle equipped with a left-hand drive, the first lateral field of rear vision being delivered by the left outer rear-view mirror 8 and the second lateral field of rear vision 9 being delivered by the right outer rear-view mirror 10.

In the case of a vehicle equipped with a right-hand drive, the first lateral field of rear vision would be the field delivered by a first right lateral outer rear-view mirror and the second lateral field of rear vision would be delivered by a second left lateral outer rear-view mirror.

The choice of the number of rear vision images essentially depends on the type of vehicle to be driven under simulated conditions. It is possible, for example, to generate only the two lateral rear vision images in the case of a truck or to generate the central rear vision image and the first lateral rear vision image if it is desired to simulate a vehicle which is not provided with a second lateral rear-view mirror.

FIG. 2A is a partial representation of the driving station of a motor vehicle driving simulator which shows the display console of this driving station. Aside from the reproduced driving instruments of a motor vehicle such as the steering-wheel 11, the dashboard 12, the gearshift lever 13, the hand-brake, the pedal unit comprising an accelerator pedal, brake pedal and clutch pedal and the seat 14, the driving station of a motor vehicle simulator comprises a display console 15 materialized in the form of a television screen 16, a loudspeaker, a module for restitution of physical effects to the steering-wheel, and a control keyboard at the disposal of an instructor so as to permit movements of scenarios and landscapes restituted on the screen 16, a trainee driver 17 being intended to take up a position on the seat 14 in the same manner as in a motor vehicle.

In the conventional manner, the operation of the device is controlled by a computer (not shown) which receives information from the instructor control keyboard, information relating to the position of the handbrake, information which indicates the speed selected by the trainee driver 17 as a function of the position of the gearshift lever 13, and information derived from pedal unit sensors and indicating the extent of downward displacement of the accelerator, brake or clutch pedals, or simultaneous action on a number of these pedals. As a general rule, a simulator of this type is also provided with a module which serves to restitute the physical effects to the steering-wheel, said module being equipped with a sensor for detecting the angular orientation of the steering-wheel 11 and with a driving element which permits restitution of the reaction forces exerted by the steering gear and the wheels on the steering-wheel 11.

As a function of all these items of information, the computer controls the motor of the module for restituting physical effects to the steering-wheel in order to simulate the reaction forces exerted by the steering gear on the steering-wheel, the indicator lights and dials which appear on the dashboard 12, the sound effects produced by the loudspeaker, and the images to be displayed on the screen 16. The computer comprises in addition an electronic circuit for interfacing with the equipment units of the driving station.

The computer comprises first means for generating a synthetic front main image 18 which is intended to be projected onto the screen 16. These first image-generating means employ for this purpose a data base (FIG. 6) from which the images are generated. This data base contains the three-dimensional description of one or a number of road circuits formed by roads, buildings, trees, vehicles, etc. The data base provides the user with driving scenes in towns, on roads and on freeways. At the time of simulation, the computer extracts from the data base the elements which serve to reconstitute the front vision which the trainee driver 17 must have according to the changes occurring in the position and orientation of the vehicle on the road circuit. This front main image corresponds to the driver's direct field of vision towards the front of the vehicle designated by the reference 3 in FIG. 1.

The computer is also provided with second means for generating a first rear vision secondary image 19 (FIG. 2B) which is intended to be inserted in the front main image 18 and constitutes the central field of rear vision designated by the reference 5 in FIG. 1. A central rear-view mirror 20 is placed in front of said first rear vision secondary image and constitutes first means for collection and optical reflection of said first secondary image. To this end, the rear-view mirror 20 is constituted by a Fresnel lens which produces an optical transfer such that the secondary image 19 is deflected towards the eyes of the trainee driver 17. The intended function of this Fresnel lens is to make the image 19 directional, with the result that the trainee driver has to adjust the rear-view mirror 20 before beginning a driving session just as a driver has to adjust his rear-view mirror before driving a real vehicle. In another variant, this Fresnel lens system can be replaced by a directional filter or any other system having the same function such as, for example, a modification of the secondary image inserted in the main image as a result of action by the trainee on an adjusting system which has the effect of modifying the inserted image by producing action on the second generating means. By way of example, the rear-view mirror 20 can be secured to the top portion of the screen 16 by means of a fixing bracket 21. The fixing bracket 21 is preferably provided with a knuckle-joint adjustment system similar to that of a real rear-view mirror.

The computer is also provided with third means for generating a second rear vision secondary image 22 (FIG. 3A) which is inserted in the front main image 18 and reproduces a first lateral field of rear vision designated by the reference 7 in FIG. 1 and possibly also with fourth means for generating a third rear vision secondary image 23 (FIG. 3A) which is inserted in the front main image 18 and reproduces the second lateral field of rear vision designated by the reference 9 in FIG. 1. These two lateral rear vision secondary images are preferably inserted in the bottom portion of the front image 18.

The display console 15 also has a casing 24 which constitutes second and third means for collection and optical reflection of the second and third secondary images respectively to a first lateral rear-view mirror 25 and to a second lateral rear-view mirror 26. These rear-view mirrors can consist of conventional rear-view mirrors customarily fitted on motor vehicles and are fixed for example on each side of the screen 16 on its lateral walls. The orientation of the rear-view mirrors 25 and 26 can be adjusted, with the result that the trainee driver 17 has to orient them in a suitable manner in order to see all the rear vision images 22 and 23 which are generated on the screen 16.

The casing 24 is so shaped as to conceal the secondary images 22 and 23 from the direct vision of the trainee driver 17. The casing is equipped internally with two mirrors 27 and 28 which reflect respectively the images 22 and 23 to the rear-view mirror 25 or 26 by means of an opening 29 or 30 formed in a left or right lateral face of the casing 24.

In an alternative embodiment of the second and third means for collection and optical reflection of the lateral secondary images, the mirrors 27 and 28 can be replaced by prisms which determine the optical paths between the screen and the rear-view mirrors.

FIG. 3A is a schematic view showing the respective positions of insertion of the rear vision secondary images 19, 22 and 23 in the main image 18 displayed on the screen 16.

FIG. 3B is a schematic top view showing the optical paths followed by the lateral rear vision images 22 and 23 from the screen 16 to the trainee driver's eyes represented by the point 31. It can be seen that each of these lateral rear vision images is first reflected while being deflected by one of the mirrors 27 or 28 to the associated lateral rear-view mirror 25 or 26 which in turn reflects the corresponding image to the point 31.

FIG. 3C is a schematic top view showing the optical path followed by the first rear vision image 19 corresponding to the central field of rear vision, from the screen 16 to the trainee driver's eyes represented schematically by the point 32. It is apparent that this first rear vision image passes through the rear-view mirror 20 which is constituted by a Fresnel lens and which deflects said image to the point 32 when the rear-view mirror is correctly oriented, thus enabling the trainee driver to see the rear vision image 19.

With reference to FIG. 4 which is a perspective view showing the display console 15 and illustrating more particularly the optical paths followed from the screen 16 to a trainee driver's eyes represented by a point 33, it is apparent that the front main image follows a direct optical path 34 whilst the secondary images inserted in the main image are deflected so as to be returned to the point 33. The first central rear vision image follows a path 35 after having passed through the rear-view mirror 20 and the two lateral rear vision secondary images follow respectively paths 36 or 37 which, after having been reflected respectively from the mirrors 27 or 28 of the casing 24, are returned to the point 33 by the external lateral rear-view mirror 25 or 26 which is associated therewith after having passed through one of the openings 29 or 30.

FIGS. 3B, 3C and 4 which illustrate the convergence of the rear vision images presented in the inner rear-view mirror 20 and in the outer rear-view mirrors 25 and 26 towards the point representing the trainee driver's eyes clearly show how, in accordance with the invention, the different fields of vision and rear vision as shown in FIG. 1 can be restituted to the trainee driver's vision, thus reproducing in simulation the visual environment of the vehicle which makes it possible to come very close to the real conditions of driving of motor vehicles.

In an alternative embodiment of the device in accordance with the invention, the rear-view mirrors 20, 25 and 26 are so designed as to permit adjustment of their orientation in order to reproduce the real conditions of car driving as precisely as possible, the trainee driver being caused to modify their orientation as a function, for example, of his height and of his position with respect to the driving station in order to see the secondary images in their entirety.

In another alternative embodiment, it is particularly advantageous to take steps to ensure that the secondary images 19, 22 and 23 are inserted in the main image 18 on portions of the screen 16 which are so dimensioned that the image seen by the trainee driver in a rear-view mirror is smaller than the secondary image inserted in the main image 18. The result thereby achieved is that, by modifying the orientation of these rear-view mirrors, the trainee driver modifies the orientation of these rear vision fields and thus finds himself in simulation situations which are very close to reality.

The secondary images are in this case collected partially by the collection and reflection means which are associated therewith, thus making it possible by adjusting a rear-view mirror to modify the collected portion of the secondary image which is associated therewith.

In accordance with another embodiment, steps can also be taken to replace the rear-view mirrors 20, 25 and 26 by additional screens corresponding in size to the rear-view mirrors and to generate the corresponding rear vision images directly on these screens.

FIG. 5 is a view in partial perspective showing an alternative embodiment of a vehicle-driving simulation station in accordance with the invention comprising two lateral screens 38 and 39 which are located on each side of the screen 16 and permit the display of an image of substantial width which simulates not only the front main image 18 on the screen 16 but also lateral images 40 and 41 corresponding to the lateral fields of vision of the vehicle on the screens 38 and 39, thus completing the environment of the road circuit by reproducing a complete direct field of vision of the driver such as the field designated by the reference 3 in FIG. 1.

The computer is provided for this purpose with fifth means for generating synthetic images and permitting the production of the images 40 and 41. In the representation of FIG. 5, the screens 38 and 39 are disposed with respect to the screen 16 in such a manner as to increase the width of the direct field of vision of the trainee driver 17. In this variant, steps can be taken to dispense with the lateral rear-view mirrors 25 and 26 and to insert the rear vision secondary images 22 or 23 in the bottom portion of the screen 38 or 39.

Depending on the visual display which is desired, steps can also be taken to orient these lateral screens 38 or 39 and to define the fifth image-generating means as a function of this orientation so that these screens display either the direct field of vision of the driver in a widened manner as illustrated in FIG. 5 or the lateral fields of vision of the vehicle such as those defined in a real condition by viewing through the side windows of the vehicle.

Figure 6:
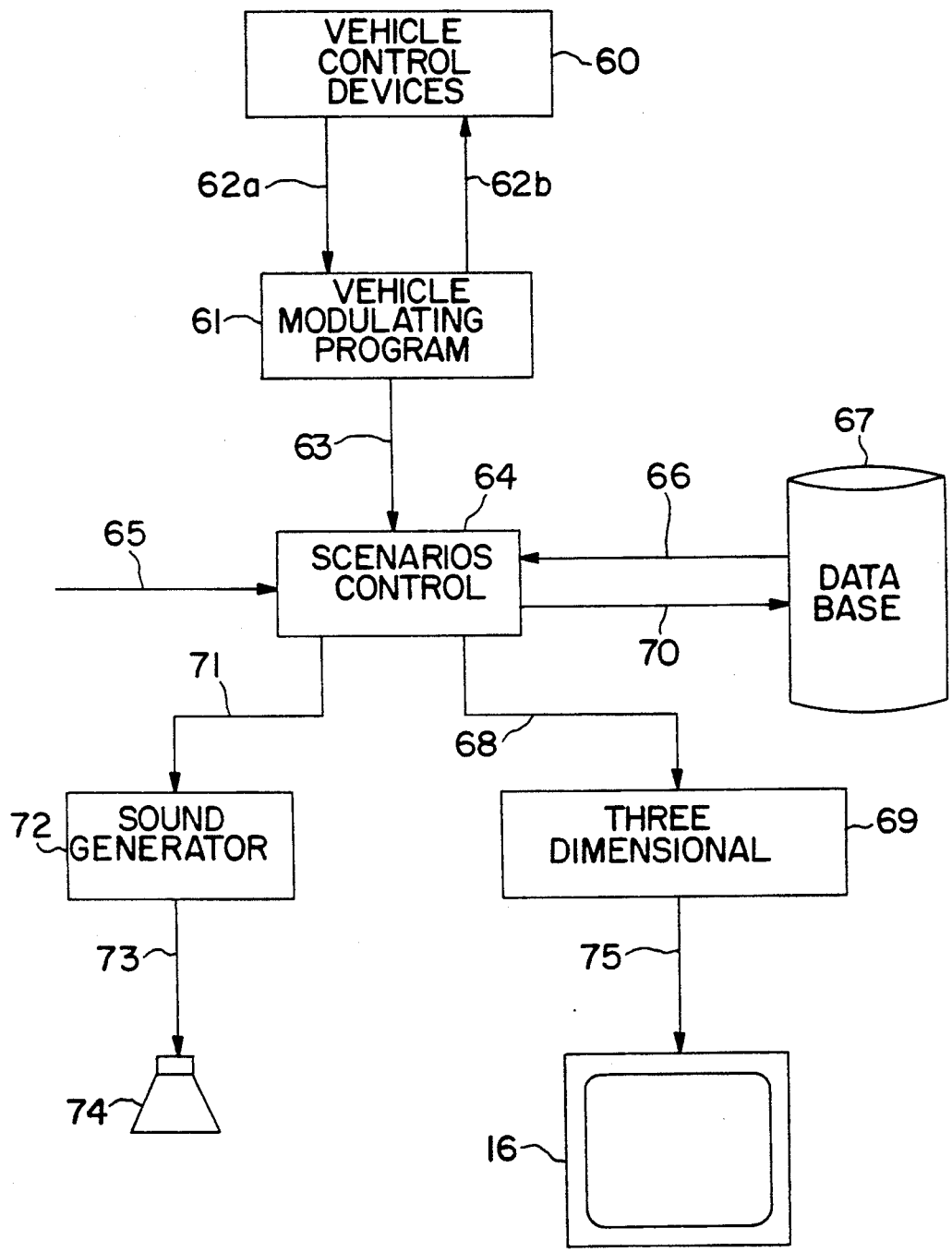
FIG. 6 is a block diagram showing the operation of the device in accordance with the invention.

FIG. 6 is a block diagram showing the operation of the simulator which, by means of the vehicle control devices 60 consisting of the steering-wheel 11, the accelerator, the clutch, the brake, the transmission, and the dashboard controls 12, transmits the driver's actions via a link 62a to a vehicle modeling program 61 which enables the computer to compute the reactions of the vehicle to the control operations of the trainee driver. These reactions are transmitted via a link 62b to the vehicle control devices 60 in order to reproduce the physical effects at the steering-wheel and to control the indicator lights and dials of the dashboard. By means of this computation, the data relating to the position and the angle of the vehicle can be transmitted via the link 63 to a means 64 for controlling scenarios. This scenario control means receives via a link 65 the orders selected by the instructor for influencing the development of the scenario in order to reproduce varied traffic conditions and hazardous situations constituted by obstacles displayed in front vision or in rear vision. Moreover, the monitor can select visual effects which make it possible to reproduce particular driving conditions such as for example driving by night, in rain or snow, in foggy weather, and so on. The scenario control means 64 receives via a link 66 data which are useful for generating main images and secondary images derived from a data base 67 in which are stored different representations of road circuits which make it possible to reproduce traffic conditions in towns, on roads and freeways. Data which are necessary for generating three-dimensional images are transmitted by the scenario control means 64 via a link 68 to a means 69 for generating these images which enables the computer to compute the main images and secondary images, for front vision, for central rear vision and for the lateral rear views. The scenario control means 64 transmits via a link 70 the items of information which are necessary for updating the data base 67 as a function of the scenario. Similarly, a link 71 enables said scenario control means 64 to transmit to a sound-generating means 72 the items of information which make it possible to generate the sounds of engine, transmission, bearings and horn which will be transmitted via a link 73 to a loudspeaker 74.

The three-dimensional image generator 69 transmits by means of a link 75 the images to be displayed on the screen 16 of the display console. These images are constituted both by the front vision main image and by the rear vision secondary images which will be inserted in the main image.

Generation of the images is carried out by collecting in the data base 67 the images corresponding to the angle of viewing of the image to be generated from the simulated position of the vehicle on the road circuit contained in the data base. From this position, the system determines the items of information to be collected for generation of the images while taking into account the angle of vision associated with the image to be generated and from the point of convergence of the field of vision.

The items of information which are necessary for generating images are stored in cartesian coordinates in the data bank 67 and are collected from said data bank in order to be displayed on the screen as a function of the viewing angles, of the position and of the direction imparted to the simulated vehicle.

Taking into account the fact that the rear vision secondary images are displayed on small portions of the screen, these secondary images are defined with lower resolution than those of the front images. Furthermore, it is possible to employ images which are more stylized in the case of the rear vision images than in the case of the front image.

In fact, the computer generates the front image and the rear vision images from data derived from the data base as a function of the simulated position of the vehicle in the road circuit, with the result that generation of images is carried out as a function of the corresponding angle of vision on the road circuit but by using the same data base irrespective of the image considered.

Thus, since the rear vision images are generated on portions of screen which are small in comparison with the front image, they have lower resolution than this latter.

The computer has the possibility of displaying sequences of still pictures or moving pictures, for example with two-dimensional graphics. These sequences will primarily be employed in the first lessons for revealing and explaining the operation of the vehicle controls to the trainee. The computer records the state of the different controls on which the trainee produces action, such as the ignition key, the lighting and warning controls, the position of the steering-wheel 11, of the pedals, of the gearshift lever 13, of the hand-brake, of the safety-belt and of the instructor's keyboard. It also carries out modeling of the vehicle dynamics in real time and modeling of engine, transmission, clutch, braking, roadholding and steering functions. An algorithmic treatment of this type makes it possible to compute at each instant the new state of the vehicle, that is to say the position, the orientation, the speed as well as the state of the different instruments and indicators as a function of the control movements imparted by the trainee, of the conditions related to the simulated external environment and of the previous state of the vehicle. The computer also carries out generation of outputs such as control of the dashboard speedometer, generation of physical effects in the steering-wheel, turn-on and turn-off of the dashboard indicator lights, sounds which are specific to driving and instruction-aid voice messages. The processing speed of the computer is such that the computations mentioned above can be repeated 15 to 20 times per second.

The method and device thus described make it possible to obtain a simulation which is closer to real car-driving conditions, especially by reproducing not only the environment which the trainee driver would observe in front of him under real conditions but also by reproducing the rear environment of the vehicle by means of the rear-view mirrors.

The invention is naturally not limited in any sense to the particular features which have been specified in the foregoing or to the details of the particular embodiments which have been chosen in order to illustrate the invention. All kinds of alternative arrangements can be made in the particular embodiments which have been described by way of example and in their constituent elements without thereby departing from the scope of the invention. Accordingly, this invention includes all means which constitute technical equivalents to the means described as well as their combinations.

We claim:

1. A driver training method comprising the steps of:
   displaying on a front screen placed opposite to a driving station both a front main image corresponding to a front view of the driver and at least one rear vision secondary image corresponding to a view provided by adjustable rear-view means,
   moving said images in reply to control operations initiated form said driving station, and
   collecting and directing optically said rear vision secondary image from said screen to an adjustable rear-view means provided in said driving station.

2. The method according to claim 1, wherein said rear vision secondary image is generated with lower resolution than the resolution with which the main image is generated.

3. The method according to claim 1, wherein said rear vision secondary image is displayed on a portion of the front screen form which the image is collected optically and reflected optically to said adjustable rear-view means.

4. The method according to claim 1, where said rear vision secondary image having a first rear vision secondary image which is an inner rear vision secondary image formed by a means of information corresponding to a central field of vision behind the driver and displayed on a first portion of said screen form which it is directed to an associated central adjustable rear-view means provided at the driving station, and a second outer rear vision secondary image formed by means for providing information corresponding to a first lateral field of vision behind the driver which is displayed on a second portion of said screen from which it is directed to a first associated lateral adjustable rear-view means provided at the driving station.

5. The method according to claim 4, wherein there is displayed on a third portion of said screen a third rear vision secondary image formed by means of information corresponding to a second lateral field of vision behind the driver, said third secondary image being directed to a second associated lateral adjustable rear-view means provided at the driving station.

6. A device for training drivers of motor vehicles, comprising:
   at least on image display screen (16) positioned opposite to a driving station having control operations for a trainee driver;
   a computer for generating images from a data base containing the description of a three-dimensional road circuit, the computer including first means for generating a front main image (18) in accordance with the control operations of said driving station, and
   second means for generating a first rear vision secondary image (19) inserted in said front main image on a first portion of said screen (16); and
   first optical means for collecting and reflecting said first secondary image (19) to an associated adjustable rear-view means (2) provided at the driving station.

7. The device according to claim 6, further comprising third means for generating a second rear vision secondary image (22) inserted in said front image (18) on a second portion of said screen (16) and second optical means (24, 27, 29) for collecting and directing said second secondary image (22) to a first associated lateral adjustable rear-view means (25) provided at the driving station.

8. The device according to claim 7, further comprising fourth means for generating a third rear vision secondary image (23) inserted in said front image (18) on a third portion of said screen (16) and third optical means (24, 28, 30) for collecting and directing said third secondary image (23) to a second associated lateral adjustable rear-view means (26) provided at the driving station.

9. The device according to claim 8, wherein said screen (16) is integrated in a casing (24) which covers a lower portion of the screen at the level of said second and third rear vision secondary images (22, 23) and said optical means is provided with at least one mirror for directing said second and third rear vision secondary images (22, 23) to said associated lateral adjustment rear-view means (25, 26), and said optical means being constituted by said casing (24).

10. The device according to claim 6, wherein said adjustable rear-view means (20, 25, 26) permit adjustment of their orientation and that the corresponding rear vision secondary images (19, 22, 23) inserted in said main image (18) are so dimensioned that said images are partly collected by said optical means associated therewith, thus making it possible by adjusting one of said adjustable rear-view means (20, 25, 26) to modify the collected portion of the secondary image (19, 22, 23) associated therewith.

11. The device according to claim 8, wherein at least one of the lateral adjustable rear-view means (25, 26) is replaced by an additional screen corresponding in size to the lateral adjustable rear-view means and that the associated rear view secondary image is generated directly on the additional screen form said data base which is stored int eh computer.

12. The device according to claim 6, wherein said optical means comprises a Fresnel leans.

13. The device according to claim 6, further including two lateral screens (38, 39) placed on each side of the first screen (16) and fifth means for generating on said lateral screens lateral main images (40, 41) corresponding to lateral field of vision of the driver.

* * * * *